R. L. ROCKWELL AND H. R. STEVENS.
ELECTRICAL LIMIT SWITCH.
APPLICATION FILED JUNE 12, 1918.
1,386,897.
Patented Aug. 9, 1921.
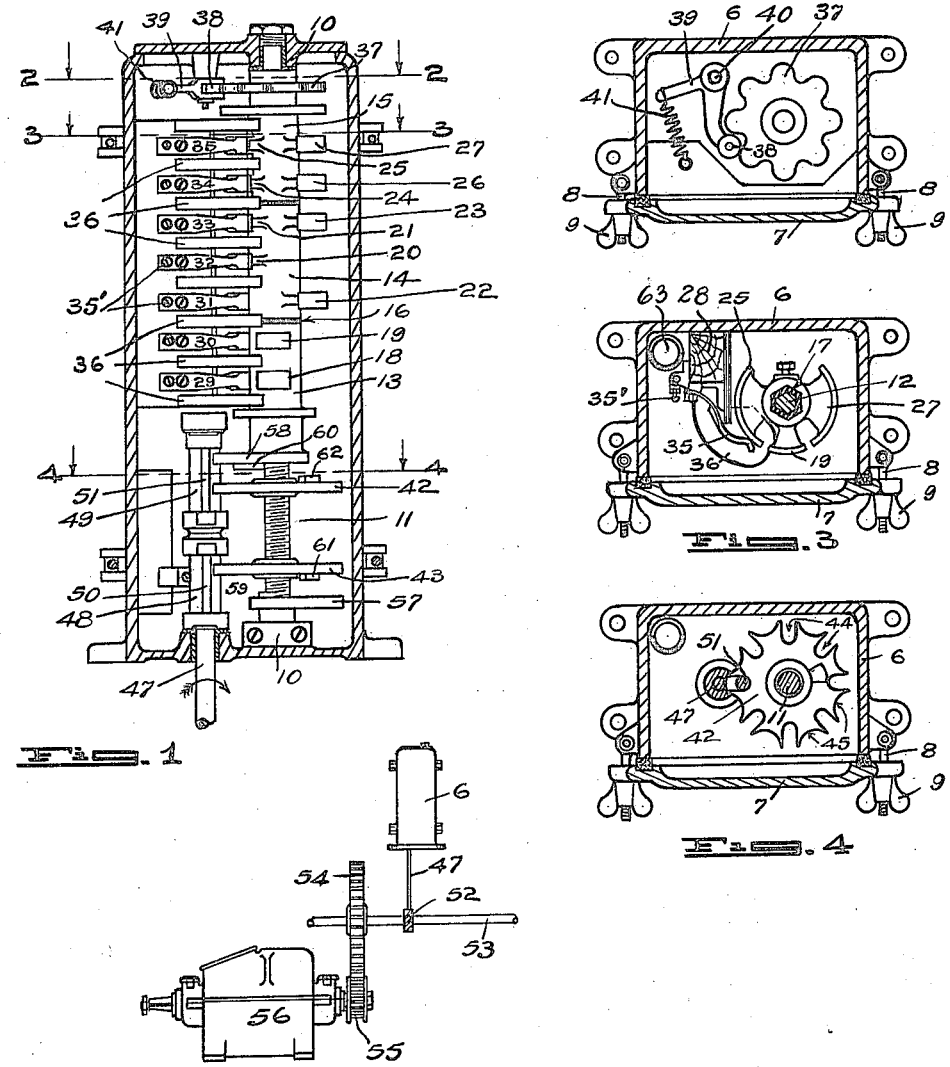
INVENTORS
ROBERT L. ROCKWELL
HENRY R. STEVENS
BY
ATTORNEY

UNITED STATES PATENT OFFICE.

ROBERT L. ROCKWELL AND HENRY R. STEVENS, OF SEATTLE, WASHINGTON, ASSIGNORS, BY MESNE ASSIGNMENTS, TO ROYAL A. McCLURE, JESSE N. BLALOCK, ALBERT E. HOLLAND, DAVID O. McCLAY, AND ERNEST G. HOWE, TRUSTEES, ALL OF SEATTLE, WASHINGTON.

ELECTRICAL LIMIT-SWITCH.

1,386,897. Specification of Letters Patent. Patented Aug. 9, 1921.

Application filed June 12, 1918. Serial No. 239,674.

*To all whom it may concern:*

Be it known that we, ROBERT L. ROCKWELL and HENRY R. STEVENS, citizens of the United States, residing at Seattle, in the county of King and State of Washington, have invented a new and useful Improvement in Electrical Limit-Switches, (of the form illustrated diagrammatically in our copending application for improvements in electrical control systems for operating railway-track switches, draw-spans, turn-tables, and the like, of even date herewith,) of which the following is a specification.

This invention relates to improvements in electrical limit switches of the form illustrated diagrammatically in our co-pending application for improvements in "electrical control systems," filed June 13, 1918, Serial Number 239,673, for operating railway track switches, draw spans, turn-tables and the like, of even date herewith.

The object of this improvement is to provide a switch of this nature that is strong and compact in construction and reliable in operation.

A further and more specific object is to provide a limit switch of this nature that is adapted to open and close certain electric circuits at the end of a predetermined number of revolutions of a driven shaft and that is adapted to close one circuit for a short period of time and then open the same during the period of operation of the switch.

The invention consists in the novel construction, adaptation and combination of parts of an electric limit switch, as will be more clearly hereinafter described and claimed.

In the accompanying drawings, Figure 1 is a view in longitudinal section of a switch constructed in accordance with this invention, showing parts of the switch mechanism in elevation; Fig. 2 is a view in cross section substantially on a broken line 2—2 of Fig. 1; Fig. 3 is a view in cross section substantially on broken line 3—3 of Fig. 1; Fig. 4 is a view in cross section substantially on broken line 4—4 of Fig. 1; and Fig. 5 is a view on a reduced scale illustrating the manner of connecting this switch with a motor.

Referring to the drawings, throughout which like reference numerals indicate like parts, the numeral 6 indicates a casing or box within which this switch mechanism is disposed, such box being provided with a removable cover plate 7 adapted to be secured thereon by screws 8 and wing nuts 9.

Extending lengthwise within the box 6 and journaled in suitable bearings 10 in the ends of such box is a shaft that consists of a round threaded end portion 11 and a portion 12 of irregular or hexagonal shape whereon are mounted three contact carriers or sleeves 13, 14 and 15 that are each insulated from each other by sections 16 of insulating material and are each insulated from the shaft portion 12 by insulating material 17, as shown in Fig. 3.

Provided on the sleeve 13 are two contact shoes 18 and 19 each having a relatively short rounded peripheral contact surface, as more clearly shown in Fig. 3.

Provided on the sleeve 14 are four contact shoes 20, 21, 22 and 23, each having relatively long peripheral contact surfaces, the shoes 20 and 21 constituting one pair and the shoes 22 and 23 constituting another pair and being disposed diametrically opposite to the shoes 20 and 21.

Provided on the sleeve 15 are four contact shoes 24, 25, 26 and 27, the shoes 24 and 25 constituting one pair and being disposed in alinement with the shoes 20 and 21 and the shoes 26 and 27 constituting another pair and being disposed in alinement with the shoes 22 and 23 and diametrically opposite to the shoes 24 and 25 and all of the shoes 24 to 27 inclusive having relatively long rounded peripheral contact surfaces, as more clearly shown in Fig. 3.

Secured at one end to a block of insulating material 28 within the casing 6 are a plurality of spring contact fingers 29, 30, 31, 32, 33, 34 and 35 that are separated from each other by guard or baffle plates 36 of insulating material and are adapted to engage with the various contact shoes 18 to 27 inclusive with which they are alined when the contact sleeves 13, 14 and 15 are rotated. The outer ends of the contact fingers are each provided with suitable terminal screws 35' by means of which electric circuit wires may be secured thereto.

Provided on the sleeve 15 near one end of the box 6 is a wheel 37 having rounded notches and teeth formed on its periphery and adapted to be engaged by a pin 38 on the end of a bell crank 39 that is mounted on a pivot 40 and adapted to be held in contact with the periphery of the wheel 37 by a helical tension spring 41 so that it will yieldingly hold the sleeves 13, 14 and 15 and shaft upon which they are mounted against any small force tending to turn them but will yield and permit the shaft and sleeves to be turned by a greater force.

Screwed upon the threaded end 11 of the shaft that carries the contact shoes are two disks 42 and 43 that are each provided at a plurality of equidistant points, preferably eight, with radial slots 44 and are further provided between the slots 44 with concave rounded portions 45.

Extending into the end of the casing 6 is a shaft 47 upon which are mounted two sleeves 48 and 49 that are provided respectively with outstanding parallel bolts or pins 50 and 51 that are adapted to engage within the slots 44 of the disks 42 and 43 as the shaft 47 is rotated the pins 50 and 51 serving to turn the disks 42 and 43 through one-eighth of one complete revolution each time the shaft 47 is turned through one complete revolution and the peripheral portion of the sleeves 42 and 43 engaging within the concave rounded peripheral portions 45 and preventing the disks from turning except when the pins 50 and 51 are in the slots 44.

The shaft 47 may be connected by a skew gear 52 with a shaft 53, that is provided with a large gear wheel 54, that meshes with a pinion 55 on the shaft of a motor 56, whereby the shaft 47 will be driven directly by the motor and at a much lower rate of speed than the motor shaft.

Secured rigidly to the shaft section 11 on each side of the disks 42 and 43 are stop members 57 and 58 respectively that are adapted when the shaft section 11 is turned to strike against or engage with the sleeves 48 and 49 and limit the turning movement of such shaft section and provided on the sides of the stop members 57 and 58 are lugs 59 and 60 respectively that are adapted to be engaged by corresponding lugs 61 and 62 on the disks 42 and 43 when such disks have been moved lengthwise of the shaft section 11, by means of the threads, a sufficient distance to cause the lugs thereon to engage with the lugs on the stops 57 and 58.

The sleeves 48 and 49 are preferably secured onto the shaft 47 by friction devices or by other means that will normally hold the sleeves tight enough so that they will drive the disks 42 and 43 but will yield and permit the shaft 47 to slip within the sleeves before any part of the switch will break or the shaft 47 twist off if anything goes wrong with the mechanism of the switch.

One end of the casing 6 is preferably provided with an opening 63 through which electric circuit wires that are connected with the fingers 29 to 35 inclusive may pass.

In operation when the switch parts are in the position shown in the drawings and the motor is started to drive the shaft 47 in the direction indicated by the arrow in Fig. 1 the disks 42 and 43 will be slowly rotated by intermittent movements and will move endwise along the screw threaded shaft 11 until the lug 62 on the disk 42 strikes the lug 60 on the stop member 58 and starts to turn the shaft 12 the pin 38 riding over the rounded teeth on the periphery of the wheel 37.

In the position shown it will be observed that closed contact exists between the fingers 34 and 35 on account of their engagement with the contact shoes 24 and 25 and that closed contact exists between the fingers 32 and 33 on account of their engagment with the contact shoes 20 and 21. As the sleeves 13, 14 and 15 rotate in a contraclockwise direction the contacts just mentioned above will be broken and a contact for a short period of time will be made between the two fingers 29 and 30 on account of their engagement with the contact shoes 18 and 19. The engagement of the contact fingers 29 and 30 with the contact shoes 18 and 19 continues during the time that the shaft 47 is making one complete revolution or until the pin 51 moves from one slot to another in the disk 42.

The same movement that breaks the contact between the fingers 29 and 30 closes a contact between the fingers 31 and 33 on account of their engagement with the contact shoes 22 and 23 and also closes a contact between the fingers 34 and 35 by reason of their engagement with the contact shoes 26 and 27.

The closing of the contacts last above named is designed to throw a switch that will shut off the motor and arrest the rotation of the shaft 47, such shaft 47 being adapted to remain at rest until the motor is again started in a reverse direction.

After the sequence of operations above described, the starting of the motor in a reverse direction will cause a breaking and making of circuits in a manner that will be readily understood.

It will be noted that the contact shoes 20 to 27 inclusive each have a comparatively long peripheral contact surface so that they will not be disengaged from their respective contact springs by turning of the shaft 12 due to coasting of the motor after the current has been shut off.

The stops 57 and 58 serve to limit the turning movement of the shaft 12 and arrest it before it has turned too far.

From the above description it will be evident that this switch has two initial positions, that two circuits are closed in each initial position, that upon movement of the shaft 12 the initial circuits are broken, another circuit is temporarily closed and then the other circuit is broken and one of the original initial circuits and still another circuit are closed.

The intermittent movement that is imparted to the shaft 11 by the slot and pin arrangement of the disks 42 and 43 insures a quick and sure making and breaking of contacts.

It is also evident that when the disks 42 and 43 have been moved to the limit of their travel in one direction on the thread of the shaft 12 it will take a predetermined number of revolutions of the motor to move them to the limit of their travel in the opposite direction and start the operation of the limit switch.

Obviously changes in the precise form of construction of this limit switch may be resorted to within the scope of the following claims.

What I claim and desire to protect by Letters Patent is:—

1. A limit switch of the class described comprising a casing, a plurality of contact fingers mounted therein and insulated from each other, a shaft extending lengthwise of said casing said shaft being threaded at one end, contact shoes arranged in pairs on said shaft the two shoes of each pair being electrically connected with each other and said pairs of contact shoes being insulated from each other, two disk like members adapted to screw onto the threaded portion of said shaft, each of said disks having a plurality of radial slots extending from the periphery inward and a plurality of concave peripheral recesses between said slots, lugs rigidly secured to said shaft, lugs rigid with said disks and adapted to engage with said fixed lugs on said shaft as said disks are rotatively moved lengthwise of said shafts, a driven shaft, sleeves frictionally secured thereon each of said sleeves having fixed outstanding pins parallel therewith that engage within successive slots in said disks to advance said disks through a part of a revolution at each complete revolution of said sleeves and yielding means engaging said first named shaft for preventing the turning of said shaft as said disks are moved on the threaded portion thereof and permitting said shaft to turn when the lug on either of said disks engages the fixed lug on said shaft.

2. A limit switch of the class described comprising a casing, a shaft extending lengthwise thereof said shaft being threaded at one end, sleeves rigidly mounted on said shaft and insulated from each other, contact shoes on said sleeves, a plurality of contact fingers mounted within the said casing and insulated from each other said contact fingers being adapted to be engaged by said shoes when said shaft is rotated, two disk like members adapted to screw on to the threaded portion of said shaft, each of said disks having a plurality of radial slots extending from the periphery inward, lugs fixedly secured to said shaft, lugs rigid with said disks and adapted to engage with said fixed lugs on said shaft as said disks are rotatively moved lengthwise of said shafts, a driven shaft and sleeves secured on said driven shaft each of said sleeves having fixed outstanding pins parallel therewith that engage within successive slots in said disks to advance said disks through a part of a revolution at each complete revolution of said sleeves.

3. A limit switch of the class described comprising a casing, a shaft extending lengthwise thereof said shaft being threaded at one end, three sleeves rigidly mounted on said shaft and insulated from each other, of contact shoes on one of said sleeves, two pairs of contact shoes on each of the other of said sleeves said first named pair of contact shoes being positioned between the two pairs of contact members on each of said other sleeves, a plurality of contact fingers mounted within the said casing and insulated from each other said contact fingers being adapted to be engaged by said shoes when said shaft is rotated, two disk like members adapted to screw on to the threaded portion of said shaft, each of said disks having a plurality of radial slots extending from the periphery inward and a plurality of concave peripheral recesses between said slots, lugs rigidly secured to said shaft, lugs rigid with said disks and adapted to engage with said fixed lugs on said shaft as said disks are rotatively moved lengthwise of said shafts, a driven shaft, sleeves frictionally secured thereon each of said sleeves having fixed outstanding pins parallel therewith that engage within successive slots in said disks to advance said disks through a part of a revolution at each complete revolution of said sleeves and yielding means engaging said first named shaft for preventing the turning of said shaft as said disks are moved on the threaded portion thereof and permitting said shaft to turn when the lug on either of said disks engages the fixed lug on said shaft.

4. A limit switch of the class described comprising a casing, a shaft extending lengthwise thereof said shaft being threaded at one end, sleeves rigidly mounted on said shaft and insulated from each other, contact shoes on said sleeves, a plurality of contact fingers mounted within the said casing and insulated from each other, said contact fingers being adapted to be engaged by said shoes when said shaft is rotated, two disk like members adapted to screw on to the threaded portion of said shaft, each of said disks having a plurality of radial slots extending from the periphery inward, lugs rigidly secured to said shaft, lugs rigid with said disks and adapted to engage with said fixed lugs on said shaft as said disks are rotatively moved lengthwise of said shafts, a driven shaft, and pins carried by said driven shaft and engageable within said notches in said disks for advancing said disks by intermittent movements.

Signed by us at Seattle, Washington, this 29 day of May, 1918.

ROBERT L. ROCKWELL.
HENRY R. STEVENS.

Witnesses:
ROYAL A. McCANN,
E. G. HOWE.